(12) United States Patent
Yang

(10) Patent No.: US 8,866,611 B2
(45) Date of Patent: Oct. 21, 2014

(54) THREE-DIMENSIONAL INPUT SENSING SYSTEM

(76) Inventor: Meng-Ta Yang, Jhubei (TW)

( * ) Notice: Subject to any disclaimer, the term of this patent is extended or adjusted under 35 U.S.C. 154(b) by 232 days.

(21) Appl. No.: 13/465,640

(22) Filed: May 7, 2012

(65) Prior Publication Data

US 2013/0015961 A1 Jan. 17, 2013

(30) Foreign Application Priority Data

Jul. 13, 2011 (TW) .............................. 100124768 A

(51) Int. Cl.
*G08B 29/00* (2006.01)
*G08B 13/00* (2006.01)
*H04M 11/00* (2006.01)
*G01R 31/00* (2006.01)
*G01P 3/04* (2006.01)
*H04Q 9/00* (2006.01)
*H04W 52/02* (2009.01)

(52) U.S. Cl.
CPC ............. *H04Q 9/00* (2013.01); *H04W 52/0254* (2013.01); *H04Q 2209/40* (2013.01)
USPC ...... 340/541; 340/506; 340/635; 340/539.11; 340/426.1; 340/426.12; 73/510; 73/1.79; 73/504.01; 319/102.06; 319/39; 319/49

(58) Field of Classification Search
CPC .................................. B60R 25/10; H04Q 9/00
USPC ................. 340/426.1, 426.17, 506, 541, 635, 340/539.11, 517, 539.1; 307/10.2; 73/510, 73/1.79, 504.01
See application file for complete search history.

(56) References Cited

U.S. PATENT DOCUMENTS

| | | | |
|---|---|---|---|
| 6,078,269 A * | 6/2000 | Markwell et al. .............. 340/517 |
| 6,828,909 B2 * | 12/2004 | Script et al. ................. 340/545.1 |
| 2002/0067341 A1 * | 6/2002 | Kobayashi ..................... 345/157 |
| 2003/0184475 A1 * | 10/2003 | Williams et al. .............. 342/465 |
| 2004/0217941 A1 * | 11/2004 | Chen .............................. 345/158 |
| 2008/0091090 A1 * | 4/2008 | Guillory et al. ............... 600/301 |
| 2008/0114252 A1 * | 5/2008 | Randall et al. ................ 600/447 |
| 2010/0277296 A1 * | 11/2010 | DeMille ..................... 340/426.1 |
| 2011/0274476 A1 * | 11/2011 | Preliasco et al. .............. 400/578 |
| 2011/0285765 A1 * | 11/2011 | Lamontagne et al. ............ 347/3 |

* cited by examiner

*Primary Examiner* — Fekadeselassie Girma
(74) *Attorney, Agent, or Firm* — Rajesh Vallabh; Foley Hoag LLP

(57) ABSTRACT

A three-dimensional (3D) input sensing system includes a 3D input device, a host, and a power managing unit. The 3D input device includes at least one 3D motion sensing unit, and transmits a radio frequency (RF) signal obtained from detected motion of the 3D input device. The host receives the RF signal from the 3D input device and obtains 3D coordinate information of the 3D input device. The power managing unit controls supply of power in the 3D input device upon determining that the latter has remained motionless for a predetermined time period.

4 Claims, 3 Drawing Sheets

001# THREE-DIMENSIONAL INPUT SENSING SYSTEM

CROSS-REFERENCE TO RELATED APPLICATION

This application claims priority of Taiwanese Application No. 100124768, filed on Jul. 13, 2011.

BACKGROUND OF THE INVENTION

1. Field of the Invention

The invention relates to an input sensing system, and more particularly to a three-dimensional input sensing system.

2. Description of the Related Art

Referring to FIG. 1, a conventional input sensing system comprises a three-dimensional (3D) input device 1 and a host 2. The 3D input device 1 has a plurality of 3D motion sensing units, such as a gyroscope 11, an accelerometer 12 and an electronic compass 13. The 3D input device 1 further has a micro controller 14, which includes a computing unit 15, a power managing unit 16 and a radio frequency (RF) transceiver unit 17, and a rechargeable battery 18. The host 2 includes a RF transceiver unit 21 and a central processing unit (or a micro controller) 22.

The 3D motion sensing units 11, 12, 13 detect motion of the 3D input device 1 and generate sensing signals corresponding to motion detected thereby. The computing unit 15 receives the sensing signals from the 3D motion sensing units 11, 12, 13, and performs computation processing upon the sensing signals so as to obtain 3D coordinate information of the 3D input device 1. The central processing unit 22 of the host 2 receives the 3D coordinate information via the RF transceiver units 17, 21, and performs an action corresponding to the 3D coordinate information. According to the 3D coordinate information of the 3D input device 1 obtained by the computing unit 15, the power managing unit 16 of the 3D input device 1 determines whether the 3D input device 1 has remained motionless for a predetermined time period. If affirmative, the power managing unit 16 stops supply of power from the battery 18 to the computing unit 15 and the RF transceiver unit 17. Subsequently, when the 3D motion sensing units 11, 12, 13 detect movement of the 3D input device 1, the power managing unit 16 resumes supply of power from the battery 18 to the computing unit 15 and the RF transceiver unit 17. Hence, power of the battery 18 may be conserved.

Because the battery 18 serves as the power source of the 3D input device 1, power resource of the 3D input device 1 is limited. Since the computing unit 15 in the 3D input device 1 consumes a lot of power when performing computations, power of the battery 18 of the 3D input device 1 is quickly used up, resulting in a shorter battery life.

SUMMARY OF THE INVENTION

Therefore, an object of the present invention is to provide a 3D input sensing system that can overcome the above drawbacks of the prior art.

According to the present invention, a three-dimensional (3D) input sensing system comprises a 3D input device, a host, and a power managing unit.

The 3D input device includes: at least one 3D motion sensing unit for detecting motion of the 3D input device in three dimensions and for generating a sensing signal corresponding to motion detected thereby; a signal collecting unit for collecting the sensing signal from the at least one 3D motion sensing unit and for outputting a collected sensing signal; and a first radio frequency (RF) transceiver unit for receiving the collected sensing signal from the signal collecting unit, for modulating the collected sensing signal into a RF signal, and for transmitting the RF signal.

The host includes: a second RF transceiver unit for receiving the RF signal transmitted by the first RF transceiver unit and for demodulating the RF signal to obtain the collected sensing signal; and a computing unit for performing computation processing upon the collected sensing signal from the second RF transceiver unit so as to obtain 3D coordinate information of the 3D input device. The host performs an action corresponding to the 3D coordinate information obtained by the computing unit.

The power managing unit is disposed in one of the 3D input device and the host, and is operable for stopping supply of power to at least one of the signal collecting unit and the first RF transceiver unit upon determining, based on one of the collected sensing signal from the signal collecting unit and the 3D coordinate information obtained by the computing unit, that the 3D input device has remained motionless for a predetermined time period.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
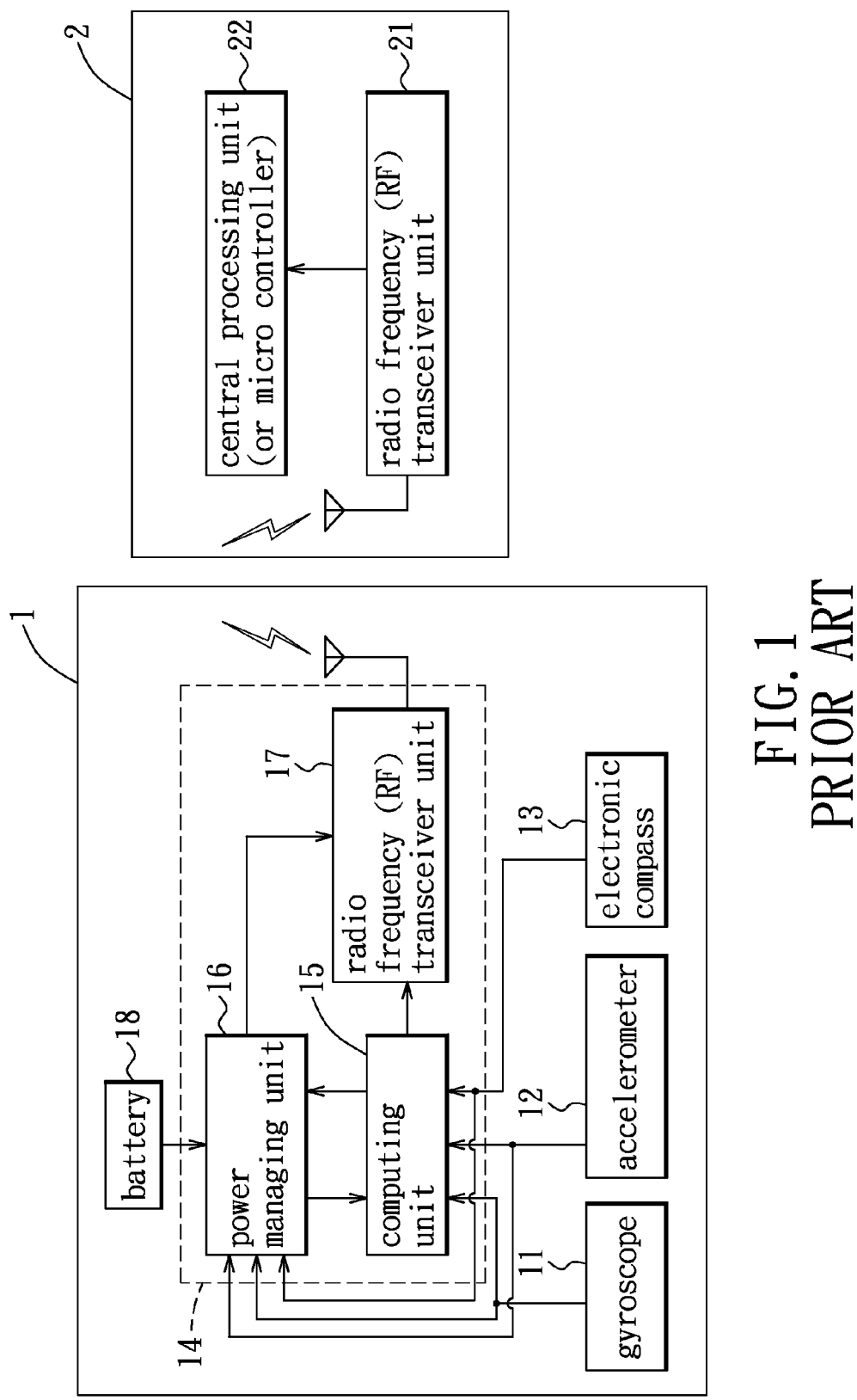
FIG. 1 is a schematic circuit block diagram showing a conventional input sensing system.
Figure 2:
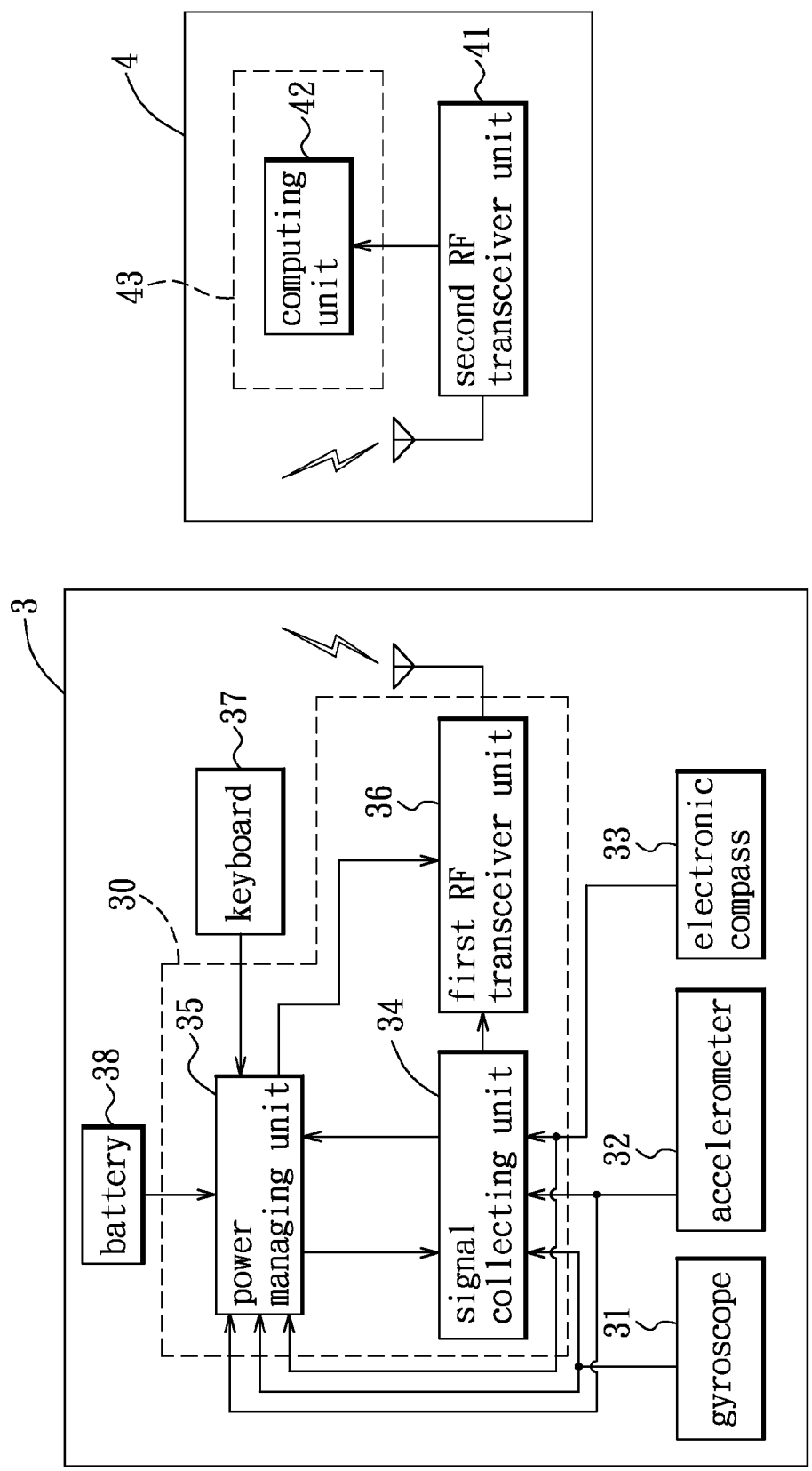
FIG. 2 is a schematic circuit block diagram showing the first preferred embodiment of a three-dimensional (3D) input sensing system of the present invention.

Referring to FIG. 2, the first preferred embodiment of a 3D input sensing system according to this invention is shown to include a 3D input device 3 and a host 4.

The 3D input device 3 is preferably a peripheral device, such as a 3D positioning device, a 3D mouse, a remote controller, a joystick, etc. The 3D input device 3 includes at least one 3D motion sensing unit, a signal collecting unit 34, a first radio frequency (RF) transceiver unit 36, and a battery 38.

The 3D input sensing system further comprises a power managing unit 35, which is disposed in the 3D input device 3 in this embodiment. Preferably, the signal collecting unit 34, the power managing unit 35, and the first RF transceiver unit 36 are integrated into a micro controller 30.

In this embodiment, the 3D input device 3 includes three 3D motion sensing units, such as a gyroscope 31, an accelerometer 32, and an electronic compass 33. The 3D motion sensing units 31-33 detect motion of the 3D input device 3 in three dimensions, i.e., angular velocity, acceleration, and displacement, and generate sensing signals corresponding to motion detected thereby.

The signal collecting unit 34 is electrically coupled to the 3D motion sensing units 31-33, collects the sensing signals from the 3D motion sensing units 31-33, and outputs the collected sensing signals to the power managing unit 35 and the first RF transceiver unit 36.

The first RF transceiver unit 36 receives the collected sensing signals from the signal collecting unit 34, modulates the collected sensing signals into a RF signal, and transmits the RF signal.

The power managing unit 35 is responsible for managing power of the battery 38 and for controlling supply of power to the 3D motion sensing units 31-33, the signal collecting unit 34 and the first RF transceiver unit 36.

According to the collected sensing signals from the signal collecting unit 34, the power managing unit 35 can determine whether the 3D input device 3 has remained motionless or not. For example, the 3D input device 3 is determined to be motionless when the output of the gyroscope 31 is continuously close to zero for a predetermined time period or when the output of the accelerometer 32 or the electronic compass 33 is non-varying during a predetermined time period. When it is determined by the power managing unit 35 that the 3D input device 3 has remained motionless for the predetermined time period, the power managing unit 35 is operable for stopping supply of power from the battery 38 to the signal collecting unit 34 and the first RF transceiver unit 36. Hence, the signal collecting unit 34 and the first RF transceiver unit 36 stop operating when the 3D input device 3 is motionless. Accordingly, power of the battery 38 may be conserved.

Moreover, the power managing unit 35 is electrically coupled to the 3D motion sensing units 31-33 for receiving the sensing signals corresponding to motion detected by the 3D motion sensing units 31-33. When supply of power to the signal collecting unit 34 and the first RF transceiver unit 36 is stopped, and the power managing unit 35 subsequently determines from the sensing signal of at least one of the 3D motion sensing units 31-33 that the 3D input device 3 has moved, such as when the output of the gyroscope 31 is not zero or when there is a change in the output of the accelerometer 32 or the electronic compass 33, the power managing unit 35 is operable for resuming supply of power from the battery 38 to the signal collecting unit 34 and the first RF transceiver unit 36. Therefore, the signal collecting unit 34 can resume collecting the sensing signals from the 3D motion sensing units 31-33 and outputting the collected sensing signals, and the first RF transceiver unit 36 can resume receiving the collected sensing signals from the signal collecting unit 34, modulating the collected sensing signals into a RF signal, and transmitting the RF signal to the host 4.

Aside from resuming supply of power from the battery 38 to the signal collecting unit 34 and the first transceiver unit 36 based on the sensing signals from the 3D motion sensing units 31-33, the power managing unit 35 may be configured to resume the supply of power upon receipt of a press key signal from a keyboard 37 of the 3D input device 3 that is coupled to the power managing unit 35. In such case, the power managing unit 35 may operate to stop supply of power to the 3D motion sensing units 31-33, the signal collecting unit 34 and the first RF transceiver unit 36 upon determining that the 3D input device 3 has remained motionless for the predetermined time period, and to resume supply of power from the battery 38 to the 3D motion sensing units 31-33, the signal collecting unit 34 and the first RF transceiver unit 36 upon receipt of the press key signal from the keyboard 37.

In this embodiment, the host 4 is a controlled device, which is an electronic device that may be remotely controlled. Non-limiting examples of the host 4 include a television set, a desktop computer, a notebook computer, a digital camera, a video camera, a projector, a mobile device, a personal digital assistant, a navigation device, a media player, an information home appliance, a television game console, a handheld game system, a remote controlled vehicle, etc.

The host 4 includes a second RF transceiver unit 41 for receiving the RF signal transmitted by the first RF transceiver unit 36 and for demodulating the RF signal to obtain the collected sensing signals. The host 4 further includes a computing unit 42 for performing computation processing upon the collected sensing signals from the second RF transceiver unit 41 so as to obtain 3D coordinate information of the 3D input device 3. The computing unit 42 may be integrated with a central processing unit 43 of the host 4. Furthermore, the central processing unit 43 performs an action or function corresponding to the 3D coordinate information obtained by the computing unit 42. Because the host 4 typically uses a stable power source, power consumed by the computing unit 42 when performing the computation processing will not result in a serious problem for the host 4. In general, the computing unit 42 of the host 4 may have stronger computation capabilities.

Although the 3D input device 3 of this embodiment includes three 3D motion sensing units 31-33, the 3D input device 3 may include only one or two of the 3D motion sensing units 31-33 or more than three 3D motion sensing units in other embodiments of this invention.

Moreover, although supply of power to the signal collecting unit 34 and the first RF transceiver unit 36 is stopped when the 3D input device 3 of this embodiment is determined to be motionless, supply of power to only one of the signal collecting unit 34 and the first RF transceiver unit 36 may be stopped in other embodiments of this invention to achieve the same effect of reducing power consumption of the 3D input device 3.

It has thus been shown that, by disposing the computing unit 42 in the host 4, power consumption of the 3D input device 3 may be reduced. In addition, by stopping supply of power to the signal collecting unit 34 and the first RF transceiver unit 36 upon determining from the collected sensing signals from the signal collecting unit 34 that the 3D input device 3 has remained motionless for a predetermined time period, the power managing unit 35 is able to further reduce the power consumption of the 3D input device 3. Moreover, through simplifying the functions of the micro controller 30 included in the 3D input device 3, the cost of the micro controller 30 may be reduced as well.

Figure 3:
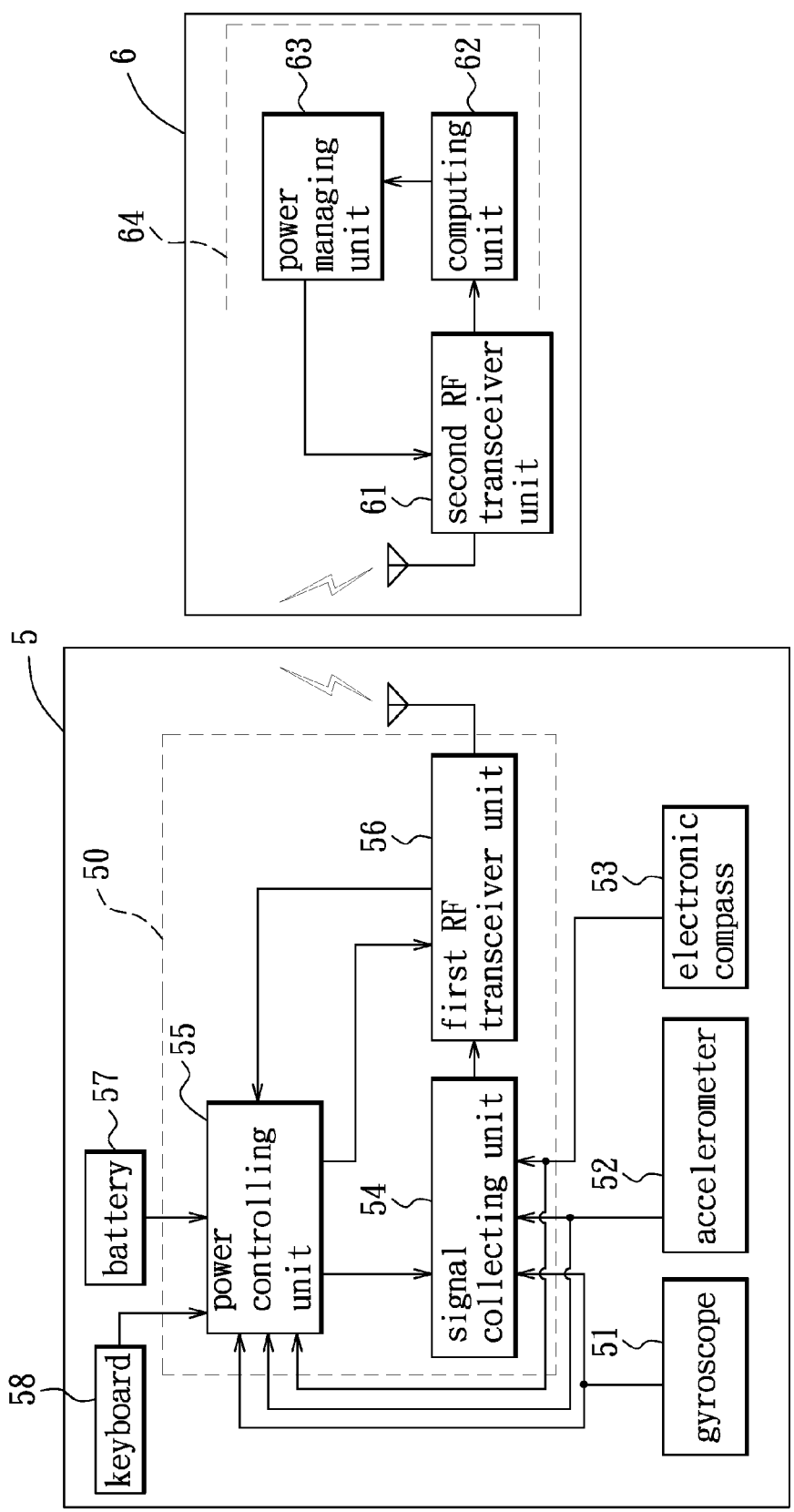
FIG. 3 is a schematic circuit block diagram showing the second preferred embodiment of the 3D input sensing system of the present invention.

Referring to FIG. 3, the second preferred embodiment of a 3D input sensing system according to this invention is shown to include a 3D input device 5 and a host 6.

The 3D input device 5 includes at least one 3D motion sensing unit, a signal collecting unit 54, a power controlling unit 55, a first radio frequency (RF) transceiver unit 56, and a battery 57. In this embodiment, the power controlling unit 55 is for controlling supply of power to the 3D motion sensing unit, the signal collecting unit 54 and the first RF transceiver unit 56. Preferably, the signal collecting unit 54, the power controlling unit 55, and the first RF transceiver unit 56 are integrated into a micro controller 50.

In this embodiment, the 3D input device 5 includes three 3D motion sensing units, such as a gyroscope 51, an accelerometer 52, and an electronic compass 53. The 3D motion sensing units 51-53 detect motion of the 3D input device 5 in three dimensions, and generate sensing signals corresponding to motion detected thereby.

The signal collecting unit 54 is electrically coupled to the 3D motion sensing units 51-53, collects the sensing signals from the 3D motion sensing units 51-53, and outputs the collected sensing signals to the first RF transceiver unit 56.

The first RF transceiver unit 56 receives the collected sensing signals from the signal collecting unit 54, modulates the collected sensing signals into a RF signal, and transmits the RF signal.

In this embodiment, the host 6 includes a second RF transceiver unit 61, a computing unit 62, and a power managing unit 63 for controlling the power controlling unit 55. Preferably, the computing unit 62 and the power managing unit 63 are integrated into a central processing unit (or micro controller) 64 of the host 6.

The second RF transceiver unit 61 receives the RF signal transmitted by the first RF transceiver unit 56 and demodulates the RF signal to obtain the collected sensing signals. The second RF transceiver unit 61 then outputs the collected sensing signals to the computing unit 62.

The computing unit 62 performs computation processing upon the collected sensing signals from the second RF transceiver unit 61 so as to obtain 3D coordinate information of the 3D input device 5. Furthermore, the central processing unit 64 performs an action or function corresponding to the 3D coordinate information obtained by the computing unit 62.

The computing unit 62 further provides the 3D coordinate information of the 3D input device 5 to the power managing unit 63. Based on the 3D coordinate information, the power managing unit 63 is operable to determine whether the 3D input device 5 has remained motionless for a predetermined time period, and to generate a power off signal upon determining that the 3D input device 5 has remained motionless for the predetermined time period. The power managing unit 63 outputs the power off signal to the second RF transceiver unit 61. The second RF transceiver unit 61 modulates the power off signal into a RF signal and transmits the RF signal to the first RF transceiver unit 56 of the 3D input device 5.

The first RF transceiver unit 56 demodulates the RF signal received from the second RF transceiver unit 61 to obtain the power off signal. The first RF transceiver unit 56 outputs the power off signal to the power controlling unit 55, and the power controlling unit 55 responds to the power off signal by stopping supply of power from the battery 57 to the signal collecting unit 54 and the first RF transceiver unit 56.

Moreover, the power controlling unit 55 is electrically coupled to the 3D motion sensing units 51-53 for receiving the sensing signals corresponding to motion detected by the 3D motion sensing units 51-53. When supply of power to the signal collecting unit 54 and the first RF transceiver unit 56 is stopped, and the power controlling unit 55 subsequently determines from the sensing signal of at least one of the 3D motion sensing units 51-53 that the 3D input device 5 has moved, such as when the output of the gyroscope 51 is not zero or when there is a change in the output of the accelerometer 52 or the electronic compass 53, the power controlling unit 55 is operable for resuming supply of power from the battery 57 to the signal collecting unit 54 and the first RF transceiver unit 56. Therefore, the signal collecting unit 54 can resume collecting the sensing signals from the 3D motion sensing units 51-53 and outputting the collected sensing signals, and the first RF transceiver unit 56 can resume receiving the collected sensing signals from the signal collecting unit 54, modulating the collected sensing signals into a RF signal, and transmitting the RF signal to the host 6.

Aside from resuming supply of power from the battery 57 to the signal collecting unit 54 and the first transceiver unit 56 based on the sensing signals from the 3D motion sensing units 51-53, the power controlling unit 55 may be configured to resume the supply of power upon receipt of a press key signal from a keyboard 58 of the 3D input device 5 that is coupled to the power controlling unit 55. In such case, the power controlling unit 55 may operate to stop supply of power to the 3D motion sensing units 51-53, the signal collecting unit 54 and the first RF transceiver unit 56 upon receipt of the power off signal, and to resume supply of power from the battery 57 to the 3D motion sensing units 51-53, the signal collecting unit 54 and the first RF transceiver unit 56 upon receipt of the press key signal from the keyboard 58.

Although the 3D input device 5 of this embodiment includes three 3D motion sensing units 51-53, the 3D input device 5 can include only one or two of the 3D motion sensing units 51-53 or more than three 3D motion sensing units in other embodiments of this invention.

Moreover, although supply of power to the signal collecting unit 54 and the first RF transceiver unit 56 is stopped when the 3D input device 5 of this embodiment is determined to be motionless, supply of power to only one of the signal collecting unit 54 and the first RF transceiver unit 56 may be stopped in other embodiments of this invention to achieve the same effect of reducing power consumption of the 3D input device 5.

It has thus been shown that, by disposing the computing unit 62 and the power managing unit 63 in the host 6, power consumption of the 3D input device 5 may be reduced. In addition, by stopping supply of power to the signal collecting unit 54 and the first RF transceiver unit 56 upon determining from the 3D coordinate information obtained by the computing unit 62 that the 3D input device 5 has remained motionless for a predetermined time period, the power consumption of the 3D input device 5 may be further reduced. Moreover, through simplifying the functions of the micro controller 50 included in the 3D input device 5, the cost of the micro controller 50 may be reduced as well.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A three-dimensional (3D) input sensing system comprising:
 a 3D input device including
  at least one 3D motion sensing unit for detecting motion of said 3D input device in three dimensions and for generating a sensing signal corresponding to motion detected thereby,
  a signal collecting unit for collecting the sensing signal from said at least one 3D motion sensing unit and for outputting the collected sensing signal, and
  a first radio frequency (RF) transceiver unit for receiving the collected sensing signal from said signal collecting unit, for modulating the collected sensing signal into a RF signal, and for transmitting the RF signal;
 a host including
  a second RF transceiver unit for receiving the RF signal transmitted by said first RF transceiver unit and for demodulating the RF signal to obtain the collected sensing signal, and
  a computing unit for performing computation processing upon the collected sensing signal from said second RF transceiver unit so as to obtain 3D coordinate information of said 3D input device,
 said host performing an action corresponding to the 3D coordinate information obtained by said computing unit; and a power managing unit configured to stop supply of power to at least one of said signal collecting unit and said first RF transceiver unit upon determining, based on one of the collected sensing signal from said signal collecting unit and the 3D coordinate information obtained by said computing unit, that said 3D input device has remained motionless for a predetermined time period, wherein said power managing unit is disposed in said host, said 3D input device further including a battery and a power controlling unit controlled by said power managing unit, said power managing unit configured to generate a power off signal upon determining, based on the 3D coordinate information obtained by said computing unit, that said 3D input device has remained motionless for the predetermined time period, the power off signal being transmitted to said power controlling unit via said second RF transceiver unit and said first RF transceiver unit, said power controlling unit being responsive to the power off signal to stop supply of power from said battery to said at least one of said signal collecting unit and said first RF transceiver unit.

2. The 3D input sensing system as claimed in claim 1, wherein, when said power controlling unit stops supply of power to said at least one of said signal collecting unit and said first RF transceiver unit, said power controlling unit is configured to resume supply of power from said battery to said at least one of said signal collecting unit and said first RF transceiver unit upon determining, based on the sensing signal from said at least one 3D motion sensing unit, that said 3D input device has moved.

3. The 3D input sensing system as claimed in claim 1, wherein said 3D input device further includes a keyboard coupled to said power controlling unit, wherein said power controlling unit is further responsive to the power off signal to stop supply of power to said at least one 3D motion sensing unit, and wherein, when said power controlling unit stops supply of power to said at least one 3D motion sensing unit and said at least one of said signal collecting unit and said first RF transceiver unit, said power controlling unit is configured to resume supply of power from said battery to said at least one 3D motion sensing unit and said at least one of said signal collecting unit and said first RF transceiver unit upon receipt of a press key signal from said keyboard.

4. The 3D input sensing system as claimed in claim 1, wherein said 3D motion sensing unit is one of a gyroscope, an accelerometer and an electronic compass.

\* \* \* \* \*